March 3, 1964
H. C. RAMSDEN
3,122,903
TORQUE LIMITING CLUTCH
Filed Dec. 15, 1961
2 Sheets-Sheet 1
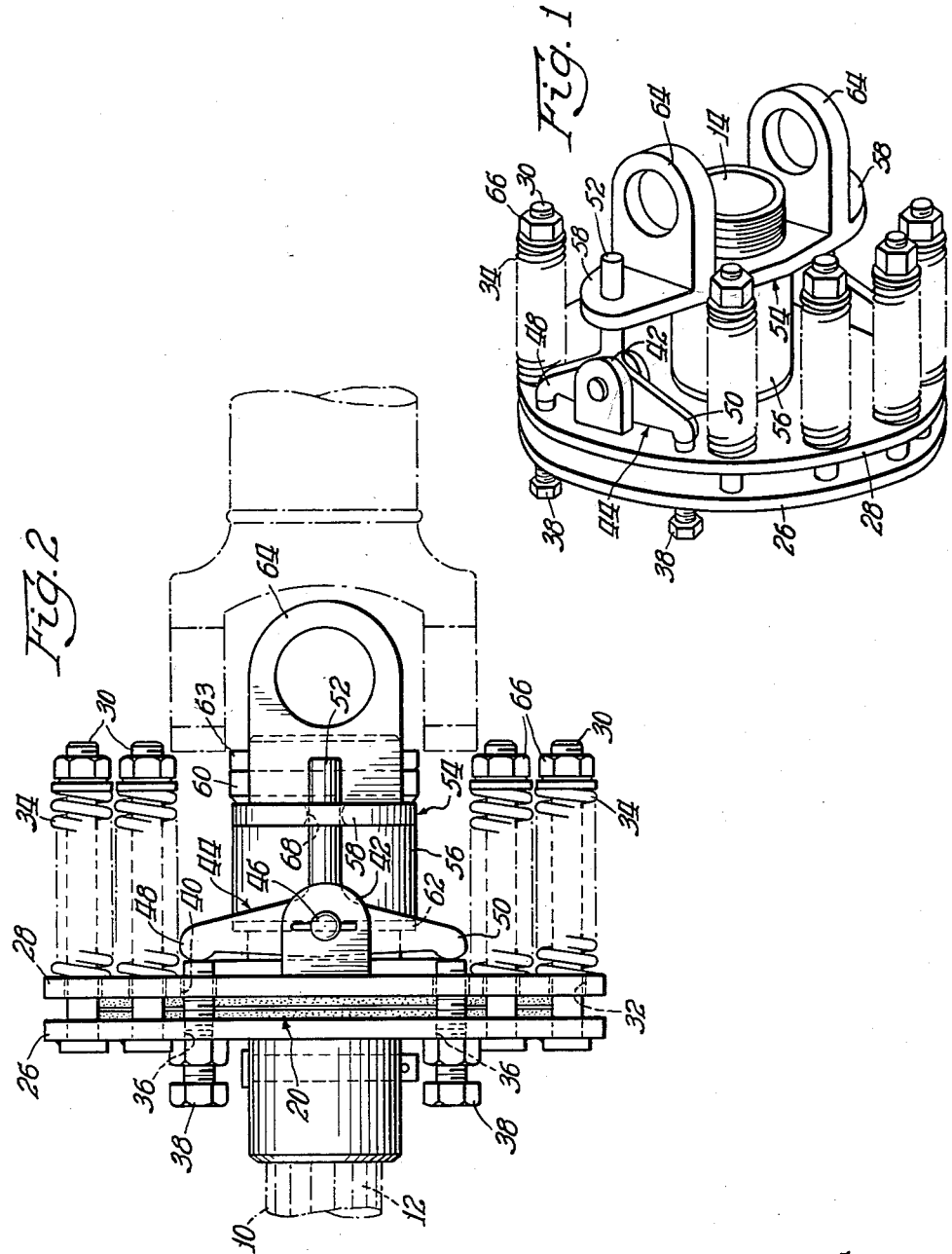
Inventor:
Henry C. Ramsden
By: John W. Butcher Atty.

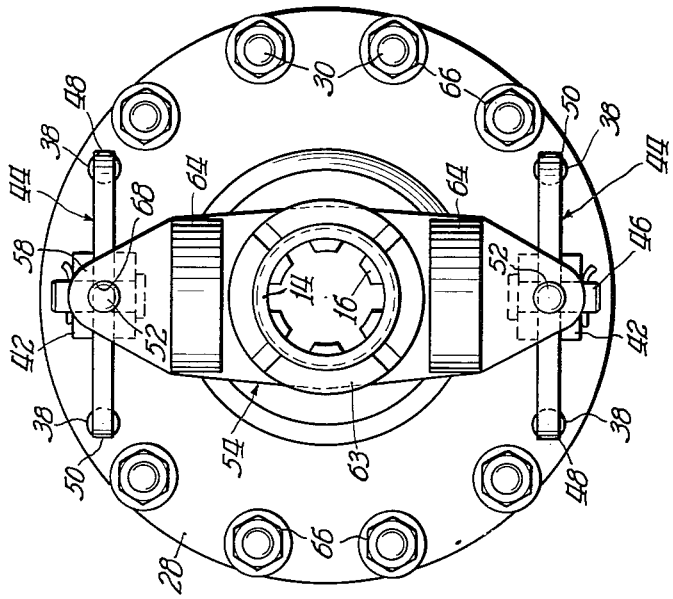

3,122,903
TORQUE LIMITING CLUTCH
Henry C. Ramsden, Home Hill, Queensland, Australia, assignor to Borg-Warner Corporation, Chicago, Ill., a corporation of Illinois
Filed Dec. 15, 1961, Ser. No. 159,579
6 Claims. (Cl. 64—30)

This invention relates to overload release clutches and more particularly to an overload release clutch arranged to disconnect torque reaction members, such as, for example, a driven plate and its associated pressure plate, upon predetermined overload conditions.

Briefly described, the overload clutch of the present invention includes a driving member and a driven member each of which are provided with a clutch element. The clutch elements are urged toward engagement by an adjustable resilient means. A lever system responsive to the torque load of the driven member is provided to act in opposition to the force exerted by the resilient means such that at a predetermined torque load on the driven member (the limit capacity of the clutch) the force exerted on the clutch element by the lever approaches the force exerted on the clutch by the resilient means and as a result the clutch slips. The torque that can be transmitted (the limit capacity of the clutch) can be varied by readjusting the force exerted by the resilient means and/or by changing the mechanical advantage of the lever system.

Other objects, advantages, and novel features of the invention will become apparent upon consideration of the detailed description taken in connection with the accompanying drawings wherein:

FIGURE 1 is a perspective of the torque limiting clutch;
FIGURE 2 is a side view of the torque limiting clutch;
FIGURE 3 is a side view, partially in cross section, of the torque limiting clutch; and
FIGURE 4 is an end view of the torque limiting clutch.

Referring now to the drawing and more particularly to FIGURE 3 a power shaft 10 with external splines 12 thereon is adapted to engage a power sleeve 14 with internal splines 16 therein. The power sleeve 14 has an external radially extending flange 18 which is arranged to carry a drive plate 20. The drive plate 20 may be fixably attached to the flange 18 to rotate therewith by means such as, for example, rivets 22. The drive plate 20 preferably carries friction linings 24a and 24b. A first pressure plate 26 having a first engagement face 26$_f$ and a second pressure plate 28 having a second engagement face 28$_f$ extend radially outwardly on opposite sides of the drive plate 20.

The first pressure plate 26 carries a plurality of bolts 30 which extend through bolt holes 32 in the second pressure plate 28. The pressure plates are urged toward each other by means of a resilient member such as, for example, springs 34 which are disposed about bolts 30. The first pressure plate 26 is provided with a plurality of threaded holes 36 which have stud bolts 38 threaded therethrough. The stud bolts 38 extend through holes 40 formed in the second pressure plate 28. The holes 40 are slightly larger in diameter than the stud bolts 38 such that the stud bolts 38 will pass therethrough.

The second pressure plate 28 carries a plurality of shackles 42 which are provided with transfer levers 44 pivotally mounted therein by way of lever pins 46. Each transfer lever 44 is provided with a first arm 48, a second arm 50, and a third arm 52. The first arm 48 and the second arm 50 extend from the shackle 42 such that the end portions thereof are adapted to engage stud bolts 38 upon rotation of the transfer lever 44 about its lever pin 46. The stud bolts 38 are preferably adjusted with respect to the first pressure plate 26 such that the ends of the stud bolts 38 are approximately .030 of an inch from engagement with the respective arm of the lever 44.

The balance arm 54 includes a hub portion 56 and a flange 58. The balance arm 54 is rotatably mounted on the power sleeve 14. A collar 60 in combination with a spacer 62 is used to maintain the balance arm 54 in a fixed axial position relative to the power sleeve. A lock nut 63 is used to maintain the collar fixed with respect to the power sleeve. By the simple expedient of changing the dimension of the spacer 62, the balance arm 54 can be shifted relative to the power sleeve 14 and thus the balance arm engaging portion 58 can be shifted relative to the third arm 52. The balance arm 54 includes a fitting 64 which may be used to connect to a drive shaft of an implement.

In operation, the nuts 66 on bolts 30 are tightened to compress springs 34 until a predetermined spring load is exerted against the friction linings 24a and 24b by the first engagement face 26$_f$ and the second engagement 28$_f$. Power is applied to rotate the power sleeve 14 such as, for example, in a clockwise direction (viewing the apparatus in FIGURE 2 from the left) by way of the power shaft 10. This power is transmitted from the power sleeve 14 to the drive plate 20 and the friction linings 24a and 24b. The first pressure plate 26 and second pressure plate 28, being urged into engagement with the friction linings, rotate along with the power sleeve 14. Rotation of the second pressure plate 28 causes the third arm 52 of the transfer levers 44 to engage the arm holes 68 formed in the flange 58 of the balance arm 54. The transfer levers 44 rotate about the lever pin 46 such that the first arm 48 of the transfer lever engages a stud bolt 38. The transfer levers 44, in effect, rotate the implement drive shaft until an overload torque is applied. An overload torque results in further rotation of the transfer levers such that stud bolts 38 are depressed thus moving the first pressure plate 26 away from the second pressure plate 28. This "unloads" the friction linings 24a and 24b and allows the driven plate 20 to rotate with respect to the pressure plates.

The maximum torque that can be transmitted (limit capacity of the clutch) is dependent upon the spring load employed to urge the pressure plates toward each other as well as upon the mechanical advantage of the transfer levers. The mechanical advantage of the transfer levers can be changed such as, for example, by shifting the hub portion 56 axially with respect to the power sleeve 14. This can be accomplished by replacing the spacer 62 with a spacer having a different axial length.

The first arm 48 has been illustrated (FIGURE 2) as approximately equal in length to the second arm 50. It will be noted the first arm 48 is effective to disengage the clutch upon the application of a predetermined clockwise torque. The second arm 50 is effective to disengage the clutch upon the application of a predetermined counterclockwise torque. In many installations it may be desirable to use a clockwise overload torque which is different than the counter-clockwise overload torque. This can be accomplished by changing the effective length of the first arm 48 and the second arm 50, for example, the respective distances from the stud bolts 38 to the lever pin 46.

The stud bolts 38 are adjustable with respect to the first pressure plate 26. This feature enables the operator to position the stud bolts 38 with the ends thereof adjacent the first arm 48 and the second arm 50 with an initial clearance of approximately .030 inch to minimize backlash and to provide for subsequent wear of the friction lining material. The stud bolts 38 may be readjusted from time to time as the friction linings diminish in thickness due to wear.

I have described this invention with the power input through shaft 10 i.e., with the power sleeve 14 as the driving member and the fitting 64 as the driven member. It will be readily understood by one skilled in the art that this apparatus functions equally well with the power input applied at the opposite end, i.e. with the fitting 64 as the driving member and the power sleeve 14 as the driven member.

While in the foregoing there have been shown and described preferred embodiments of the apparatus of the present invention, it is to be understood that minor changes in the details of construction, combination and arrangement of parts may be resorted to without departing from the spirit and intent of the invention.

I claim:

1. A torque limiting clutch comprising a drive plate adapted to be connected to a first shaft, a plurality of pressure plates, first means adapted to exert a first force to urge said pressure plates toward engagement with said drive plate, a second shaft connected to said pressure plates, a transfer lever responsive to torque applied between said first shaft and said second shaft to exert a second force against said pressure plates to urge said pressure plates in a direction away from engagement with said drive plate; said transfer lever having a mechanical advantage; said second force being a function of said torque and said mechanical advantage; and means to change said mechanical advantage of said transfer lever whereby the magnitude of said second force can be changed with respect to said torque.

2. A torque limiting clutch in accordance with claim 1 wherein said transfer lever means is pivotally connected to one of said pressure plates and includes a first lever arm responsive to engage said other pressure plate and a third lever arm, and wherein one of said shafts includes a balance arm driven thereby in a manner to engage said third lever arm to provide a driving connection therewith, and means to shift said balance arm and said third lever arm relative to each other such that the mechanical advantage of said lever can be changed.

3. A torque limiting clutch in accordance with claim 1 wherein said transfer lever is pivotally connected to one of said pressure plates and wherein said transfer lever includes a pair of arms adapted to engage the other of said pressure plates and wherein said transfer lever includes a third lever arm, and a balance arm driven by one of said shafts drivingly connected to said third arm and shiftable relative to said third arm providing said means to change said mechanical advantage.

4. A torque limiting clutch in accordance with claim 3 including adjustable means interposed between said pair of arms and said other of said pressure plates providing an initial predetermined clearance between said pair of arms and said pressure plates, and providing for subsequent readjustment of said clearance between said pair of arms and said other of said pressure plates to compensate for wear of said drive plate and said pressure plates to minimize backlash in said torque limiting clutch.

5. A torque limiting clutch in accordance with claim 4 wherein said adjustable means includes stud bolts, adjustably mounted within said other of said pressure plates extending toward said pair of arms providing said predetermined clearance.

6. A torque limiting clutch in accordance with claim 5 wherein said stud bolts are received within said other of said pressure plates by a thread connection with a lock nut associated therewith.

References Cited in the file of this patent

UNITED STATES PATENTS

| 1,411,126 | Page | Mar. 28, 1922 |
| 2,540,997 | Schmitter | Feb. 6, 1951 |

FOREIGN PATENTS

| 306,259 | Great Britain | Feb. 21, 1929 |
| 774,720 | Great Britain | May 15, 1957 |